Nov. 3, 1942. W. L. SCHOTT 2,300,706
POWER TRANSMISSION BELT
Filed Sept. 2, 1941
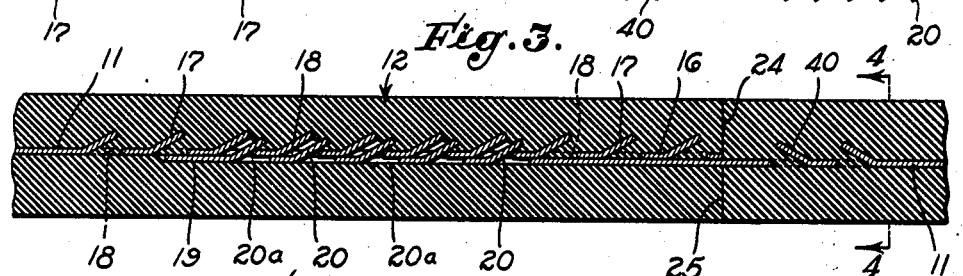
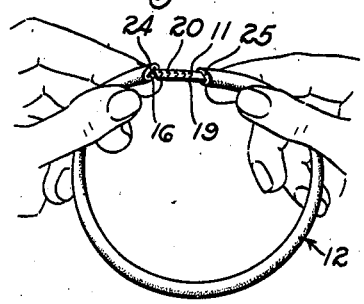
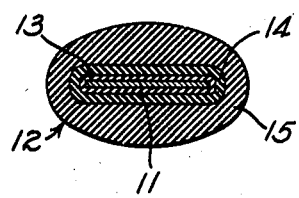
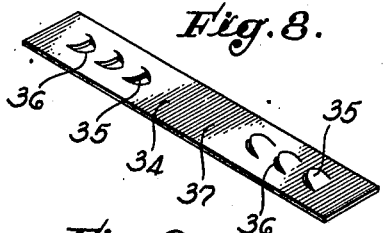
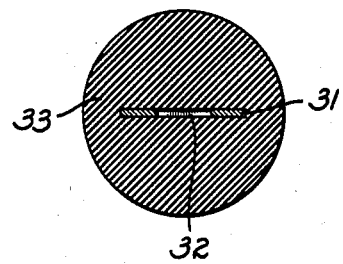
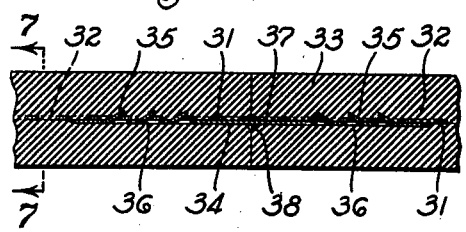
INVENTOR
WALTER L. SCHOTT
BY HARRIS, KIECH, FOSTER & HARRIS
FOR THE FIRM
ATTORNEYS.

Patented Nov. 3, 1942

2,300,706

UNITED STATES PATENT OFFICE 2,300,706

POWER TRANSMISSION BELT

Walter L. Schott, Los Angeles, Calif.

Application September 2, 1941, Serial No. 409,205

8 Claims. (Cl. 74—237)

This invention relates to power transmission belts, and particularly to belts for turning the dials and other rotatable members in radio sets and similar instruments. Belts constructed in accordance with this invention may be also used in other fields and particularly in fields where the desideratum is the transmission of power between two low speed rotatable members.

It is an object of this invention to provide a power transmission belt of the character set forth which will not stretch or break, which is highly flexible and will not slip upon either the driving or driven rotatable element.

It is another object of the invention to provide a power transmission belt of the character set forth comprising a steel core and a rubber sheath in which the sheath will be securely bonded to the core and will not become separated therefrom.

It is another object of this invention to provide in a power transmission belt of the character described means for splicing the two ends of a length of such a belt which will be readily operated and which will secure the belt ends against accidental disconnection.

It is still another object of this invention to provide a belt of the character described, which may be supplied in an open-ended length capable of being spliced to make an endless belt of any length within certain limits, as required by the belt length between two pulleys or other driving and driven rotatable elements. It is often difficult to install on two pulleys a belt of the right length which is initially made endlessly continuous, because of the necessity of disassembling adjacent parts of the instrument or machine as a prerequisite to the installation.

To illustrate the invention, the drawing and specification show and describe a belt primarily intended for use in radio sets, but it is to be understood that the invention is not limited to belts for use in radio sets but is capable of other adaptations and uses.

In the drawing:

Fig. 1 is a plan view of a core of a belt embodying this invention, drawn to a scale of four times the size of an actual belt designed for use on radio sets;

Fig. 2 is a side view of the core shown in Fig. 1;

Fig. 3 is a sectional view of a belt embodying this invention drawn to twice the scale used in Figs. 1 and 2 and incorporated in the belt;

Fig. 4 is a cross-sectional view of the belt shown in Fig. 3 taken along the line 4—4 of Fig. 3;

Fig. 5 is a perspective view showing the method by which the ends of an open length of the belt are spliced;

Fig. 6 is a longitudinal sectional view of the belt embodying the invention in a modified form, the belt being shown about four times the size of an actual belt;

Fig. 7 is an enlarged cross-sectional view of the belt shown in Fig. 6 taken along the line 7—7 of Fig. 6; and Fig. 8 is a perspective view of the splicing strip used in connection with the belt embodying the modified form of the invention which is illustrated in Figs. 6 and 7.

The belt shown in Figs. 1 to 5, inclusive, comprises a core 11 and a sheath 12. The core is a flat, relatively thin and relatively wide strip of hard spring steel. Preferably the stock from which the core is made is at least twenty times as wide as it is thick. The actual dimensions of the core from which the drawings are made are .003" thick and 1/8" wide. By reason of the characteristics of the specially tempered, highly flexible, hard spring steel from which the core is made and by reason of its great width relative to its thickness, the core has high flexibility enabling it to conform to the curvature of the periphery of the pulleys which it connects, has high resistance to fracture under tensile stress, enabling it to be stretched tightly and bend about the pulleys without breaking, and has high resistance to elongation preventing it from becoming loose upon the pulleys after a period of use.

The core 11 is surrounded by an enveloping sheath 12 of rubber. This sheath is preferably of oblate shape in cross section, as shown in Fig. 4. The rubber sheath 12 may be applied to the core by the extrusion method or in any other suitable manner. According to one method, the steel core is immersed successively in three baths of liquid rubber in which it receives respectively an inner coating 13 of rubber, an intermediate coating 14 of rubber, and an outer coating 15 of rubber, as illustrated in Fig. 4. The composition of the rubber of the inner coating 13 is such as to give it an adhesive bond to the steel core. The composition of the rubber of the intermediate coating 14 is such as to give the intermediate coating a proper bond with the coating 13 and the coating 15. This intermediate coating may be omitted if desired. The composition of the rubber coating 15 is such as to provide a resilient sheath with an outer surface having a high coefficient of friction, with the object of preventing the belt from slipping upon the pulleys which it engages.

One end portion 16 of the core 11 is formed with a plurality of louvered tongues 17 which are stamped from the body of the core and project outwardly therefrom, leaving perforations 18 in the core. These tongues are inclined outwardly and toward the adjacent end of the core and are preferably uniformly spaced along the center line of the core.

The other end portion 19 of the core is formed with similar louvered tongues 20 and perforations 20a similarly spaced evenly along the center line of the core, the tongues projecting from the same side of the body of the core as do the tongues 17 but being narrower than the tongues 17 and inclined away from the adjacent end of the core. The rubber sheath extends from the extreme tip of the end portion 16 to a point spaced at substantial distance from the innermost of the tongues 20, as indicated by the line 21 on Fig. 1.

The belts of any given cross sectional size are supplied for use in several standard lengths. Each of these standard lengths may be cut to any one of several lengths to form a belt of the exact length for a given installation. Thus, one standard length of belt may be shortened by cutting a piece from its end portion 16 to make an endless belt of any desired length from 6¾" to 10". Another standard length may be used for any one of several installations requiring belts from 10⅛" to 13 5/16", etc. The perforations 18 and tongues 17 extend a sufficient distance from the tip of the end portion 16 of each standard length to permit cutting off the necessary length of this end portion and yet leave several of the tongues 17 when such a standard length of belt is being prepared for the installation of the shortest length of belt for which the standard length is intended to be used.

In installing a belt of this invention, the required length of the belt is first ascertained by placing a string or a flexible paper rule around the pulleys to be connected measuring the string and adding to the string measurement an increment sufficient to allow for the greater length of the belt due to its thickness. Thereafter a belt of proper standard length is selected and shortened by removing so much of the end portion 16 as will make the distance from the line of the cut, as for instance the line 28, to the line 21 equal to the length of the belt around the pulleys as previously ascertained. The belt is then placed around the pulley bringing the belt ends together as indicated in Fig. 5. The end portion 19 of the core 11 is inserted under the end portion 16 of the core and between it and the sheath 12 and pushed home until the faces 24 and 25 of the sheath are brought into contact. The rubber of the surrounding sheath presses the core end 19 up against the core end 16 and causes the tongues 20 to push up through the perforations 18. Any force tending to pull the belt ends apart causes the tongues 20 to become more securely interlocked in the apertures 18. The unperforated core between the line 21 and the perforations 20a affords a strong connecting link between the belt ends. The tongues 17 inhibit relative movement of the sheath 12 on the core 11 in a direction away from the core end, thus aiding to maintain the bond between the sheath and core. If desired, tongues 40 directed oppositely to tongues 20 may be formed inwardly of the line 21 on the core end 19 to similarly inhibit relative movement of the sheath and core.

Because of the bond between the rubber sheath and the steel core, it is sometimes difficult to push the core end 19 between the rubber sheath and the core end 16. In that case a small piece of steel similar to the core may be inserted between the core end 16 and the sheath to loosen the sheath from the core prior to insertion of the core end 19. A belt of this invention may be readily installed without time-consuming disassembling of neighboring parts of the instrument or machine on which it is to be installed. When installed it is of exactly the right length, will not slip upon the pulleys which it engages, will flexibly conform to the pulleys, and will not stretch.

In Figs. 6, 7, and 8 is illustrated another form of the invention. In this form of the invention a steel strip 31 of indefinite length and of substantially the same cross sectional dimension as the core 11 is formed with perforations 32 extending from end to end thereof. The steel from which this strip is made is preferably of substantially the same composition as the core 11 of the form of the invention illustrated in Figs. 1 to 5 inclusive.

The strip of steel 31 is coated by the extrusion method or in any other desired manner with a rubber sheath 33 of either circular cross section as illustrated in Fig. 7, of oblate cross section like the belt illustrated in Fig. 4, or of any other cross sectional shape depending upon the character of the installation. The composition of the rubber thus formed as a sheath upon the core is such as to give it an adhesive bond to the core and to provide it with an outer surface having a high coefficient of friction.

A belt stock of indefinite length is thus manufactured. A belt section of the required length is cut from this belt stock and the open ends of the belt section are united to form an endless belt by means of a tie strip 34. The tie strip 34 is preferably identical with the core 31 as to its material from which it is made and as to its cross sectional dimensions. The tie strip 34 is formed with a plurality of louvered tongues 35 and perforations 36 like the tongues 20 and perforations 20a. These tongues are evenly spaced in two groups along the longitudinal center line of the tie strip 34, each group being arranged adjacent an end of the tie strip with a substantial spacing between the two groups at the median portion 37 of the tie strip. The tongues of both groups project from the same side of the tie strip and the tongues of each group are inclined away from the adjacent end of the tie strip. Preferably a small stop lug 38 is welded on the side of the tie strip opposite that from which the tongues 35 project.

In connecting the ends of the belt, the tie strip 34 is inserted between the core 31 and the sheath 33 of one open end of the belt and pushed home until the stop 38 engages the face of the end of the sheath or, if no stop is used, until approximately half of the tie strip has been inserted between the core and sheath of the belt. The other end of the tie strip is then inserted between the core and sheath of the other open end of the belt and is pushed home until the end faces of the sheath are brought into contact, the stop 38 preventing further inward movement of the first inserted end of the tie strip. During these operations of insertion of the two ends of the tie strip, the tongues 35 enter and seat themselves in the perforations 32 locking the two open ends of the belt against separation. The median portion 37 of the tie strip, being devoid of perforations, affords a strong connecting link between the belt ends.

The word "rubber" as used herein is meant to include materials other than natural rubber, such as synthetic rubber and plastics which have similar qualities of resilience and compressibility.

While two embodiments of the invention are shown and described herein, it is readily apparent that the invention is not limited in scope as to either or both of these embodiments but has a wider scope as defined in the appended claims.

I claim as my invention:

1. In a power transmission belt, the combination of: a flat relatively thin and relatively wide core of steel having adjacent one of its ends a plurality of spaced deformations aligned longitudinally of said core; a rubber sheath bonded to said core but separable therefrom at an exposed end of said belt by insertion of a thin elongated object between said sheath and core; and means for securing said exposed end to a like belt end, comprising an unsheathed steel strip similar to said core and arranged to project from said like belt end and adapted for insertion between said core and sheath and formed with spaced deformations, said deformations being aligned longitudinally of said strip and adapted for interlocking engagement with said core deformations to prevent movement of said exposed end away from said like belt end, said strip and core being held flat against each other by compressive pressure of said sheath to maintain said interlocking engagement of said core deformations and said strip deformations.

2. In a power transmission belt, the combination of: a flat relatively thin and relatively wide core of steel having adjacent one of its ends a plurality of spaced perforations aligned longitudinally of said core; a rubber sheath bonded to said core but separable therefrom at an exposed end of the belt by insertion of a thin elongated object between said sheath and core; and means for securing said exposed end to a like belt end comprising a steel strip similar to said core and arranged to project from said like belt end and adapted for insertion between said core and sheath and formed with spaced projections on one side face, said projections being aligned longitudinally of said strip and adapted for interlocking engagement with said core perforations to prevent movement of said like belt end away from said exposed end, said strip and core being held flat against each other by compressive pressure of said sheath to maintain said interlocking engagement of said perforations and said projections.

3. In a power transmission belt, the combination of: a flat relatively thin and relatively wide core of steel; a plurality of first spaced louvered tongues stamped from said core and providing first perforations aligned longitudinally of said core adjacent one end thereof, said tongues projecting from one side of said core and toward said one end and overhanging said perforations respectively; a plurality of second spaced louvered tongues stamped from said core and providing second perforations aligned longitudinally of said core adjacent the other end thereof, said second tongues projecting from said side of said core and away from said other end and being narrower than said first perforations; and a rubber sheath bonded to said core and extending from said one end thereof to a point substantially spaced from said other end, said second perforations being disposed between said other end of said core and the adjacent end of said sheath, said sheath being separable from said core by insertion of an end of unsheathed core therebetween.

4. In a power transmission belt, the combination of: a flat relatively thin and relatively wide core of steel having a row of evenly spaced perforations disposed longitudinally thereof; a rubber sheath bonded to said core but separable therefrom at the exposed end of the belt by insertion of a thin elongated object between said sheath and core; and means for securing said exposed end to the terminal of a similarly constructed belt or to the other end of said belt comprising a strip of metal similar to said core and having a plurality of spaced tongues adjacent each end thereof, said tongues projecting from the same side of said strip and inclined away from the adjacent end of said strip and adapted for engagement with said perforations, said strip and core being held flat against each other by compressive pressure of said sheath to maintain said engagement of said perforations and tongues.

5. In a power transmission belt, the combination of: a flat relatively thin and relatively wide core of steel having a row of evenly spaced perforations disposed longitudinally thereof; a rubber sheath bonded to said core but separable therefrom at the exposed end of the belt by insertion of a thin elongated object between said sheath and core; and means for securing said exposed end to the terminal of a similarly constructed belt or to the other end of said belt comprising a strip of metal similar to said core and having a plurality of spaced tongues adjacent each end thereof, and a stop projecting from a side of the median portion of said strip, said tongues projecting from the same side of said strip and inclined away from the adjacent end of said strip and adapted for engagement with said perforations, said strip and core being held flat against each other by compressive pressure of said sheath to maintain said engagement of said perforations and tongues.

6. In a power transmission belt, the combination of: a flat relatively thin and relatively wide core of steel; a plurality of first spaced louvered tongues stamped from said core and providing first perforations aligned longitudinally of said core adjacent one end thereof, said tongues projecting from one side of said core and toward said one end and overhanging said perforations respectively; a plurality of second spaced louvered tongues stamped from said core and providing second perforations aligned longitudinally of said core adjacent the other end thereof, said second tongues projecting from said side of said core and away from said other end and being narrower than said first perforations; a rubber sheath bonded to said core and extending from said one end thereof to a point substantially spaced from said other end, said second perforations being disposed between said other end of said core and the adjacent end of said sheath, said sheath being separable from said core by insertion of an end of unsheathed core therebetween; and at least one tongue projecting from one side of said core adjacent said other end and disposed inwardly of said second spaced louvered tongues and projecting toward said other end.

7. In a fastening device, the combination of: a first flat member having adjacent an end thereof a plurality of spaced deformations aligned longitudinally of said member; a second flat member adapted to have an end overlap and lie flat against said end of said first member and formed with similarly spaced longitudinally aligned deformations adapted for interlocking with said first mentioned deformations when said ends are in overlapping relationship; and a rubber sheath encircling said overlapped ends and arranged to press inwardly upon the outer flat faces of said ends to hold said ends in said overlapping relationship.

8. The combination defined in claim 1 in which said strip has no deformation in a limited length thereof on each side of said exposed end when said strip is in interlocked relation with said core.

WALTER L. SCHOTT.